US008792369B2

(12) United States Patent
Alanara

(10) Patent No.: US 8,792,369 B2
(45) Date of Patent: Jul. 29, 2014

(54) METHOD FOR SETTING A MOBILE NODE SPECIFIC CYCLIC PREFIX IN A MOBILE COMMUNICATION

(75) Inventor: Seppo Matias Alanara, Oulu (FI)

(73) Assignee: Broadcom Corporation, Irvine, CA (US)

(*) Notice: Subject to any disclaimer, the term of this patent is extended or adjusted under 35 U.S.C. 154(b) by 525 days.

(21) Appl. No.: 13/098,810

(22) Filed: May 2, 2011

(65) Prior Publication Data
US 2012/0281551 A1 Nov. 8, 2012

(51) Int. Cl.
H04W 56/00 (2009.01)
(52) U.S. Cl.
USPC ........... 370/252; 370/328; 370/343; 370/350; 370/503; 455/63.1; 455/422.1
(58) Field of Classification Search
None
See application file for complete search history.

(56) References Cited

U.S. PATENT DOCUMENTS

2009/0122771 A1* 5/2009 Cai .............................. 370/338
2010/0118806 A1  5/2010 Griot et al.
2010/0165873 A1* 7/2010 Higuchi et al. ............... 370/254
2010/0208603 A1* 8/2010 Ishii ............................. 370/252

OTHER PUBLICATIONS

3GPP TSG RAN WG1#55;R1-084336; Title: Analysis on uplink/downlink time delay issue for distributed antenna system; Source: Huawei, CMCC, RITT, CATT; Pragie, Czech Republic, Nov. 10-Nov. 14, 2008.
3GPP TSG RAN WG1 Meeting #54bis; R1-083917; Title: Clarification on the operation for normal and extended CP; Source: NTT DOCOMO, Inc, AT&T, T-Mobile; Prague, Czech Republic, Sep. 29-Oct. 3, 2008.

* cited by examiner

Primary Examiner — Chi Pham
Assistant Examiner — Shick Hom
(74) Attorney, Agent, or Firm — Stanton IP Law

(57) ABSTRACT

The invention concerns a method and an apparatus implementing the method. In the method is determined in a mobile node whether the mobile node supports mobile node specific cyclic prefixes. The mobile node transmits to a base station node an indication whether the mobile node supports mobile node specific cyclic prefixes. The base station node measures a delay spread of a radio resource transmitted by the mobile node. The mobile node receives an indication of an uplink direction cyclic prefix length from the base station node. The mobile node forms a cyclic prefix of the uplink direction cyclic prefix length selected from a useful symbol, adds the cyclic prefix in front of the useful symbol and transmits a signal comprising the cyclic prefix and the useful symbol to the base station.

20 Claims, 8 Drawing Sheets

METHOD FOR SETTING A MOBILE NODE SPECIFIC CYCLIC PREFIX IN A MOBILE COMMUNICATION

BACKGROUND OF THE INVENTION

1. Field of the Invention

The invention relates to mobile communications networks, cyclic prefixes and a method for setting a mobile node specific cyclic prefix in a mobile communication system.

2. Description of the Related Art

A radio signal may propagate through different paths between a transmitter and a receiver. This is due to the fact that, for example, high-rise buildings and mountains reflect radio waves. A reflection may be further reflected. The reflections give rise to the delay spread of a signal. Multiple signals generated by a single transmitted signal may reach the receiver. The reflections are delayed and attenuated to some degree. The delay is due to the different lengths of the paths that the reflections may travel. The reflected signals that are delayed causes either gains in the signal strength or deep fades. In deep fades the signal level is so low that it is not possible for the receiver to determine the transmitted signal. Delay spread of signal reflections exceeding the duration of one Orthogonal Frequency Division Multiplexing (OFDM) symbol cause frequency-selective fading. The delay spread where the duration of one symbol is not exceeded is called flat fading. In order to mitigate the delay spreading, cyclic prefixes are used in the OFDM technology, which is a multicarrier modulation technology that uses orthogonal subcarriers to convey information. A Cyclic Prefix (CP) is a copy of the last part of a composite signal that is added to the front of the composite signal formed as an inverse discrete Fourier transformation of the modulated subcarriers. The cyclic prefix acts as a guard time between successive symbols. If the duration of the transmission of the cyclic prefix exceeds the maximum delay spread, the Inter-Symbol Interference (ISI) is eliminated.

In the Long-Term Evolution (LTE) system specified by the 3G Partnership Project (3GPP) that uses OFDM for downlink transmission, there is defined the use of two cyclic prefix lengths, namely a normal CP and an extended CP. In propagation environments where there is a possibility for multiple reflections having a long propagation time between the transmitter and the receiver, such as in a mountainous or an urban area, where the root means squared delay spread may exceed 4.7 µs, an Evolved Node B (eNB) needs to be configured to use the extended CP instead of the normal CP. The extended CP can handle up to 16.67 µs root mean squared delay spread in the received signal so that there is no signal deterioration. In severe cases, the eNB configures mobile nodes in the area of the eNB to use lower Modulation and Coding Scheme (MCS) to be less susceptible to radio path degradation. The disadvantage in the use of the extended CP is the smaller space for packet traffic payload, because in each 1 ms subframe there are only 12 symbols instead of the 14 symbols in the case of normal CP. As the consequence, the normal CP allows 17% higher bit rate compared with the extended CP, provided that the MCS and retransmission rate are comparable. In the area of a single cell there may be different propagation environments.

Delay spread may also be caused by the use of a spatially dispersed antenna system to communicate with a mobile node. In distributed base stations or eNBs Remote Radio Heads (RRH) are separate from a base station server. An RRH comprises the base station's RF circuits, analog-to-digital/digital-to-analog converters and up/down converters. The RRH also has operation and management processing capabilities and a standardized optical interface to connect to the base station server. RRHs may also be used in the case of Multiple-Input and Multiple-Output (MIMO) transmission between a base station and a mobile node. In the case of a set of RHHs in a cell to communicate with a mobile node, the mobile node may experience different delay spread depending on the position of the mobile node relative to the RHHs in the cell footprint. Therefore, there may be cases where in the area of a single cell a mobile node could use the normal CP instead of an extended CP.

In prior art the use of either an extended CP or a normal CP is configured on cell basis. The CP is configured based on delay spread measurements executed beforehand in the radio network planning phase. The use of either normal CP or extended CP is indicated to a mobile node in cell broadcast information or in handover signaling. Whether normal CP or extended CP is used in downlink direction is determined by a mobile node implicitly as the relative distance between Primary Synchronization Signals (PSS).

Due to the aforementioned factors it would be beneficial to be able to use different cyclic prefixes depending on the actual delay spread. The delay spread may be caused by different propagation environments or by a different position of a mobile node relative to a number of remote radio heads, antennas or antenna ports. The use of a cyclic prefix shorter than the extended cyclic prefix in the cases where the propagation environment or the position of the mobile node permits it would free radio resources for data transmission.

US 2010/0118806 discloses use of different cyclic prefix lengths depending on packet class, but it does not discuss the situation of different actual delay spreads within a single cell and the possibility of mobile node specific cyclic prefixes within a single cell.

SUMMARY OF THE INVENTION

According to an aspect of the invention, the invention is a method, comprising: performing at least one uplink direction delay spread measurement of a radio resource transmitted by a mobile node; selecting, at a base station, an uplink direction cyclic prefix length for at least one uplink radio resource based on the at least one uplink direction delay spread measurement; indicating the selected uplink direction cyclic prefix length to the mobile node; and receiving an uplink direction signal from the mobile node with the uplink direction cyclic prefix length selected.

According to a further aspect of the invention, the invention is a method, comprising: transmitting, by a mobile node, a radio resource to enable the measuring of an uplink direction delay spread; receiving an indication of an uplink direction cyclic prefix length specific to the mobile node from a base station; forming an uplink direction cyclic prefix of the uplink direction cyclic prefix length selected from a useful uplink symbol; adding the uplink direction cyclic prefix in front of the useful uplink symbol; and transmitting an uplink signal comprising the uplink direction cyclic prefix and the useful uplink symbol to the base station.

According to a further aspect of the invention, the invention is a base station comprising: at least one radio frequency circuit configured to perform at least one uplink direction delay spread measurement of a radio resource transmitted by a mobile node and to receive an uplink direction signal from the mobile node with an uplink direction cyclic prefix length selected; and at least one processor configured to select the uplink direction cyclic prefix length for at least one uplink radio resource based on the at least one uplink direction delay spread measurement and to indicate the uplink direction cyclic prefix length selected to the mobile node.

According to a further aspect of the invention, the invention is a base station comprising: at least one radio frequency circuit configured to perform at least one uplink direction delay spread measurement of a radio resource transmitted by a mobile node, to receive an uplink direction signal from the mobile node with an uplink direction cyclic prefix length selected, to select the uplink direction cyclic prefix length for at least one uplink radio resource based on the at least one uplink direction delay spread measurement, and to indicate the uplink direction cyclic prefix length selected to the mobile node.

According to a further aspect of the invention, the invention is a base station comprising: means for performing at least one uplink direction delay spread measurement of a radio resource transmitted by a mobile node; means for selecting an uplink direction cyclic prefix length for at least one uplink radio resource based on the at least one uplink direction delay spread measurement; means for indicating the selected uplink direction cyclic prefix length to the mobile node; and means for receiving an uplink direction signal from the mobile node with the uplink direction cyclic prefix length selected.

According to a further aspect of the invention, the invention is an apparatus, comprising: at least one radio frequency circuit configured to transmit a radio resource to enable the measuring of an uplink direction delay spread, to form an uplink direction cyclic prefix of an uplink direction cyclic prefix length selected from a useful uplink symbol, to add the uplink direction cyclic prefix in front of the useful uplink symbol and to transmit an uplink signal comprising the uplink direction cyclic prefix and the useful uplink symbol to the base station; and at least one processor configured to receive an indication of the uplink direction cyclic prefix length from a base station, the uplink direction cyclic prefix length being specific to the apparatus.

According to a further aspect of the invention, the invention is a computer program comprising code adapted to cause the following when executed on a data-processing system: performing at least one uplink direction delay spread measurement of a radio resource transmitted by a mobile node; selecting, at a base station, an uplink direction cyclic prefix length for at least one uplink radio resource based on the at least one uplink direction delay spread measurement; indicating the selected uplink direction cyclic prefix length to the mobile node; and receiving an uplink direction signal from the mobile node with the uplink direction cyclic prefix length selected.

According to a further aspect of the invention, the invention is a computer program product comprising the computer program.

According to a further aspect of the invention, the invention is a computer program comprising code adapted to cause the following when executed on a data-processing system: transmitting, by a mobile node, a radio resource to enable the measuring of an uplink direction delay spread; receiving an indication of an uplink direction cyclic prefix length specific to the mobile node from a base station; forming an uplink direction cyclic prefix of the uplink direction cyclic prefix length selected from a useful uplink symbol; adding the uplink direction cyclic prefix in front of the useful uplink symbol; and transmitting an uplink signal comprising the uplink direction cyclic prefix and the useful uplink symbol to the base station.

According to a further aspect of the invention, the invention is a computer program product comprising the computer program.

According to a further aspect of the invention, the invention is a method comprising: measuring a first uplink direction delay spread of a radio resource transmitted from a mobile node by a first base station receiver; measuring a second uplink direction delay spread of a radio resource transmitted from a mobile node by a second base station receiver; reporting the first uplink direction delay spread and the second uplink direction delay spread to a base station node; selecting a maximum uplink direction delay spread by the base station node among the first uplink direction delay spread and the second uplink direction delay spread; selecting an uplink direction cyclic prefix length for at least one uplink radio resource based on the maximum uplink direction delay spread; indicating the uplink direction cyclic prefix length selected to the mobile node; and receiving an uplink direction signal from the mobile node with the uplink direction cyclic prefix length selected.

According to a further aspect of the invention, the invention is a system, comprising: a first base station receiver configured to measure a first uplink direction delay spread of a radio resource transmitted from a mobile node, to report the first uplink direction delay spread to a base station node, and to receive an uplink direction signal from the mobile node with the uplink direction cyclic prefix length selected; a second base station receiver configured to measure a second uplink direction delay spread of a radio resource transmitted from a mobile node, to report the second uplink direction delay spread to a base station node, and to receive an uplink direction signal from the mobile node with the uplink direction cyclic prefix length selected; and a base station node configured to select a maximum uplink direction delay spread among the first uplink direction delay spread and the second uplink direction delay spread, to select an uplink direction cyclic prefix length for at least one uplink radio resource based on the maximum uplink direction delay spread and to indicate the uplink direction cyclic prefix length selected to the mobile node.

According to a further aspect of the invention, the invention is a computer program comprising code adapted to cause the following when executed on a data-processing system: measuring a first uplink direction delay spread of a radio resource transmitted from a mobile node by a first base station receiver; measuring a second uplink direction delay spread of a radio resource transmitted from a mobile node by a second base station receiver; reporting the first uplink direction delay spread and the second uplink direction delay spread to a base station node; selecting a maximum uplink direction delay spread by the base station node among the first uplink direction delay spread and the second uplink direction delay spread; selecting an uplink direction cyclic prefix length for at least one uplink radio resource based on the maximum uplink direction delay spread; indicating the uplink direction cyclic prefix length selected to the mobile node; and receiving an uplink direction signal from the mobile node with the uplink direction cyclic prefix length selected.

In one embodiment of the invention, the base station comprises a base station node. In one embodiment of the invention, the base station comprises a base station server. In one embodiment of the invention, the base station comprises at least one remote radio head.

In one embodiment of the invention, the base station comprises at least one remote transceiver. The at least one radio frequency circuit of the base station may be comprised in a remote or local transceiver. The at least one processor of the base station may be comprised in a base station node or a base station server or a base station computer unit.

In one embodiment of the invention, the first base station receiver and the second base station receiver are transceivers, for example, receivers and transmitters. A transceiver may be comprised in a remote base station.

In one embodiment of the invention, the first base station receiver and the second base station receiver are comprised in a first remote base station and a second remote base station, respectively.

In one embodiment of the invention, the performing of at least one uplink direction delay spread measurement of a radio resource, transmitted by a mobile node, may be done in at least one of a base station transceiver, a remote radio head, a base station server and a base station unit. In one embodiment of the invention, the selecting of an uplink direction cyclic prefix length for at least one uplink radio resource, based on the at least one uplink direction delay spread measurement, may be performed in at least one of a base station transceiver, a remote radio head, a base station server and a base station unit. In one embodiment of the invention, the indicating of the selected uplink direction cyclic prefix length to the mobile node may be performed in at least one of a base station transceiver, a remote radio head, a base station server and a base station unit. In one embodiment of the invention, the receiving of an uplink direction signal from the mobile node with the uplink direction cyclic prefix length selected may be performed in at least one of a base station transceiver, a remote radio head, a base station server and a base station unit.

In one embodiment of the invention, the useful uplink symbol and the useful downlink symbol are OFDMA or Single Carrier Frequency Division Multiple Access (SC-FDMA) symbols. The uplink direction cyclic prefix and the downlink direction cyclic prefix may be formed using the uplink direction useful symbol and downlink direction useful symbol, respectively, for example, so that the uplink direction cyclic prefix is formed from a part of the useful uplink symbol and the downlink direction cyclic prefix is formed from a part of the useful downlink symbol. A useful symbol may also be called an encoded symbol. A useful symbol may also be called a symbol. In OFDMA a useful symbol may be seen as a time superposition of narrowband modulated subcarriers. In the case of SC-FDMA the useful symbol may be seen as comprising a single frequency carrier modulated with at least one complex time domain signal.

In one embodiment of the invention, by a useful symbol is meant a symbol without a concatenated cyclic prefix.

In one embodiment of the invention, is a copy of a number of last samples of an OFDM or SC-FDMA symbol that is prepended to the transmitted symbol and removed at the receiver before demodulation.

In one embodiment of the invention, the at least one processor or the at least one radio frequency circuit of the base station or the base station node is configured to select a first shorter length for the uplink direction cyclic prefix length, if length of the uplink direction delay spread measured is below a predefined threshold value, and a second longer length, if length of the uplink direction delay spread measured is above the predefined threshold value. The selected uplink direction cyclic prefix length may be communicated by the at least one processor of the base station or the base station node to the mobile node. The at least one processor of the mobile node may provide the selected uplink direction cyclic prefix length to the at least one radio frequency circuit of the mobile node.

In one embodiment of the invention, the at least one radio frequency circuit of the base station or the base station node is configured to remove at least one uplink direction cyclic prefix from the uplink signal received to obtain at least one useful uplink symbol.

In one embodiment of the invention, the at least one processor of the base station or the base station node is configured to receive an indication whether the mobile node supports mobile node specific cyclic prefixes.

In one embodiment of the invention, the at least one processor of the base station or the base station node is configured to select a downlink direction cyclic prefix length for at least one downlink radio resource. The at least one radio frequency circuit at the base station or the base station node is configured to form a downlink direction cyclic prefix of the downlink direction cyclic prefix length selected from a useful downlink symbol, to add the downlink direction cyclic prefix in front of the useful downlink symbol and to transmit a signal comprising the downlink direction cyclic prefix and the useful downlink symbol to the mobile node. The selection of the downlink direction cyclic prefix length for the at least one downlink radio resource may be performed on the basis of at least one delay spread measurement performed by the at least one radio frequency circuit of the base station, or on the basis of an indication of delay spread duration or proposed cyclic prefix length from the mobile node.

In one embodiment of the invention, the at least one processor of the base station or the base station node is configured to activate use of cyclic prefixes in response to detecting that a traffic distribution between mobile nodes supporting mobile node specific cyclic prefixes and mobile nodes not supporting mobile node specific cyclic prefixes exceeds a predefined threshold.

In one embodiment of the invention, the at least one radio frequency circuit of the base station or the base station node is configured to transmit a radio resource to the mobile node to enable the measuring of a downlink direction delay spread at the mobile node.

In one embodiment of the invention, the at least one processor of the base station or the base station node is configured to receiving from the mobile node an indication of the downlink direction delay spread measured by the mobile node and to select a downlink direction cyclic prefix length based on the downlink direction delay spread.

In one embodiment of the invention, the at least one processor of the base station or the base station node is configured to receiving from the mobile node an indication of a downlink direction cyclic prefix length.

In one embodiment of the invention, the at least one processor of the base station or the base station node is configured to indicate the downlink direction cyclic prefix length selected to the mobile node.

In one embodiment of the invention, the at least one processor of the base station or the base station node is configured to detect a change in antenna configuration and to activate measuring of the uplink direction delay spread in response to the change in antenna configuration.

In one embodiment of the invention, the at least one processor of the base station or the base station node is configured to activate the measuring of the uplink direction delay spread periodically.

In one embodiment of the invention, the at least one processor at the mobile node is configured to determining whether the mobile node supports mobile node specific cyclic prefixes and to transmit, to the base station node, an indication whether the mobile node supports mobile node specific cyclic prefixes.

In one embodiment of the invention, the at least one processor of the mobile node is configured to receive an indication from the base station node of a downlink direction cyclic prefix length. The at least one radio frequency circuit of the mobile node is configured to receive a downlink signal from the base station node and to remove at least one downlink direction cyclic prefix having the downlink direction cyclic prefix length from the downlink signal to obtain at least one useful downlink symbol.

In one embodiment of the invention, the method further comprises activating, at the base station or the base station node, for example, by the at least one processor, use of cyclic prefixes in response to detecting that a capacity exceeding a predefined threshold is made available in a cell provided by the base station node by the use of shorter cyclic prefixes for mobile nodes supporting mobile node specific cyclic prefixes.

In one embodiment of the invention, at least one processor of the base station or the base station node is configured to count the number of mobile nodes that indicate a delay spread shorter or equal to a cyclic prefix that is shorter than the cyclic prefix currently used in a cell or cell beam provided by the base station node. The at least one processor may also be configured to determine the capacity obtained by the use of shorter cyclic prefixes for mobile nodes supporting mobile node specific cyclic prefixes.

In one embodiment of the invention, the method further comprises transmitting, by the at least one radio frequency circuit of the mobile node, at least one radio resource adapted to allow the at least one radio frequency circuit of the base station node to measure the delay spread.

In one embodiment of the invention, the method further comprises receiving, by the at least processor of the mobile node, an indication from the base station node of a change in antenna configuration and activating, for example, by the at least processor of the mobile node, a measuring of the downlink direction delay spread in response to the indication of the change in antenna configuration.

In one embodiment of the invention, the at least one processor at the mobile node may receive an indication from the base station or the base station node of a change in antenna configuration. The mobile node may, in response to the indication, perform the measuring of the downlink direction delay spread of a radio resource transmitted from the base station node, for example, by the at least one radio frequency circuit.

In one embodiment of the invention, the at least one radio frequency circuit of the mobile node measure the delay spread periodically.

In one embodiment of the invention, the receiving the indication of the uplink direction cyclic prefix length is via at least one of Packet Data Control Channel signaling, Media Access Control signaling and Radio Resource Control signaling.

In one embodiment of the invention, the signal comprising the uplink direction cyclic prefix and the useful uplink symbol is transmitted on uplink shared channel.

In one embodiment of the invention, the at least one processor of the mobile node is configured to propose at least one of an uplink direction cyclic prefix length and a downlink direction cyclic prefix length to the base station. In one embodiment of the invention, the at least one radio frequency circuit of the mobile node is configured to measure radio quality of at least one radio resource and to indicate the radio quality to the at least one processor of the mobile node. If the radio quality is below a predefined threshold, the at least one processor is configured to propose at least one of an uplink direction cyclic prefix length and a downlink direction cyclic prefix length to the base station. The proposal for a cyclic prefix length may also be an indication that currently used downlink direction cyclic prefix length is not sufficient, that is, that the length of at least the downlink direction cyclic prefix must be extended. In response, the at least one processor of the base station may indicate least one of the uplink direction cyclic prefix length and the downlink direction cyclic prefix length to the base station. In the indication the cyclic prefix lengths may be longer than the previously used.

In one embodiment of the invention, a delay spread measurement may be a radio quality measurement or comprise a radio quality measurement. If the radio quality data obtained from the measurement does not satisfy a predetermined condition, the delay spread length may be approximated to have a particular value or to exceed a particular value. The radio quality measurement may be performed in the at least one radio frequency circuit of the mobile node or in the at least one radio frequency circuit of the base station.

In one embodiment of the invention, the mobile node comprises a Long-Term Evolution (LTE) User Equipment. At least one processor in the mobile node may be configured to perform the method steps disclosed hereinabove. The transmission, cyclic prefix forming and adding related method steps may be performed by the at least one radio frequency circuit.

In one embodiment of the invention, the base station is a system comprising a number of base station receivers and/or transmitters and a base station node. The base station node may be a base station server or a central unit.

In one embodiment of the invention, the at least one radio frequency circuit of the base station is comprised in a base station receiver and the at least one processor of the base station is comprised in a base station node. The base station receiver may also comprise a transmitter.

In one embodiment of the invention, at least one processor at a base station node is configured to select the uplink direction cyclic prefix length for at least one uplink radio resource based on the at least one uplink direction delay spread measured to indicate the uplink direction cyclic prefix length selected to the mobile node.

In one embodiment of the invention, the base station node is a central unit of a coordinated multipoint transmission and reception base station set. Such a set of base stations serve a mobile node at a border area of the cells of the base stations. In this case the at least processor of the base station node may be further configured to communicate with at least one remote base station in the coordinated multipoint transmission and reception base station set to transmit a downlink signal to the mobile node and to receive an uplink signal from the mobile node. The at least one processor of the base station node may be further configured to measure an uplink direction delay spread of a radio resource from a composite signal formed from multiple signals received by different antennas at the remote base stations. The at least one processor or the at least one radio frequency circuit of the mobile node may be configured to measure a delay spread in a composite downlink signal resulting from the signals received by the mobile node from the antennas of the remote base stations.

In one embodiment of the invention, the remote base stations belonging to the coordinated multipoint transmission and reception base station set and serving a mobile node are configured to measure delay spreads in uplink signals that the remote base stations receive from the mobile node. The remote base stations are configured to report the delay spreads to the base station node, which selects the maximum delay spread to be used in the selection of the uplink direction cyclic prefix length to be indicated to the mobile node.

In one embodiment of the invention, the base station node comprises an Evolved UMTS Radio Access Network (E-UT- RAN) node such as, for example, an Evolved NodeB. At least one processor in the base station node may be configured to perform the method steps disclosed hereinabove. The transmission, cyclic prefix forming and adding related method steps may be performed by the at least one radio frequency circuit.

In one embodiment of the invention, the base station node comprises an OFDMA radio network node or an SC-FDMA radio network node.

In one embodiment of the invention, the at least of radio frequency circuit in the base station node is configured to receive two different random access channels, one with a normal cyclic prefix and one with an extended cyclic prefix.

In one embodiment of the invention, the at least of radio frequency circuit in the mobile node is configured to transmit on two different random access channels, one with a normal cyclic prefix and one with an extended cyclic prefix.

In one embodiment of the invention, the length of the normal cyclic prefix is 4.69 microseconds and the length of the extended cyclic prefix is 16.66 microseconds.

In one embodiment of the invention, the uplink cyclic prefix lengths and downlink cyclic prefix lengths are selected from a set comprising 4.69 microseconds and 16.66 microseconds, for example, by the at least one processor at the base station.

In one embodiment of the invention, the at least one Radio Frequency (RF) circuit in the mobile node may also be referred to as at least one circuit.

In one embodiment of the invention, the at least one Radio Frequency (RF) circuit in the base station node may also be referred to as at least one circuit.

In one embodiment of the invention, the mobile node such as a User Equipment (UE) comprises a mobile station or generally a mobile terminal. In one embodiment of the invention a user of a mobile terminal is identified using a subscriber module, for example, User Services Identity Module (USIM) or a Subscriber Identity Module (SIM). The combination of Mobile Equipment (ME) and a subscriber module may be referred to as a mobile subscriber.

In one embodiment of the invention, the apparatus is a mobile terminal, for example a, mobile handset.

In one embodiment of the invention, the apparatus is a semiconductor circuit, a chip or a chipset.

In one embodiment of the invention, the apparatus is a chipset.

In one embodiment of the invention, the base station node is configured to be used in a 4G system such as, for example, LTE Evolved Packet System (EPS).

In one embodiment of the invention, the computer program is stored on a computer readable medium. The computer readable medium may be, but is not limited to, a removable memory card, a removable memory module, a magnetic disk, an optical disk, a holographic memory or a magnetic tape. A removable memory module may be, for example, a USB memory stick, a PCMCIA card or a smart memory card.

In one embodiment of the invention, the computer program product is stored on a computer readable medium. The computer readable medium may be, but is not limited to, a removable memory card, a removable memory module, a magnetic disk, an optical disk, a holographic memory or a magnetic tape. A removable memory module may be, for example, a USB memory stick, a PCMCIA card or a smart memory card.

The embodiments of the invention described hereinbefore may be used in any combination with each other. Several of the embodiments may be combined together to form a further embodiment of the invention. A method, a base station, an apparatus, a computer program or a computer program product to which the invention is related may comprise at least one of the embodiments of the invention described hereinbefore.

The benefits of the invention are related to enhanced bitrate for transmission in uplink or downlink direction, which is due to the avoiding of too long cyclic prefixes.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 1A:
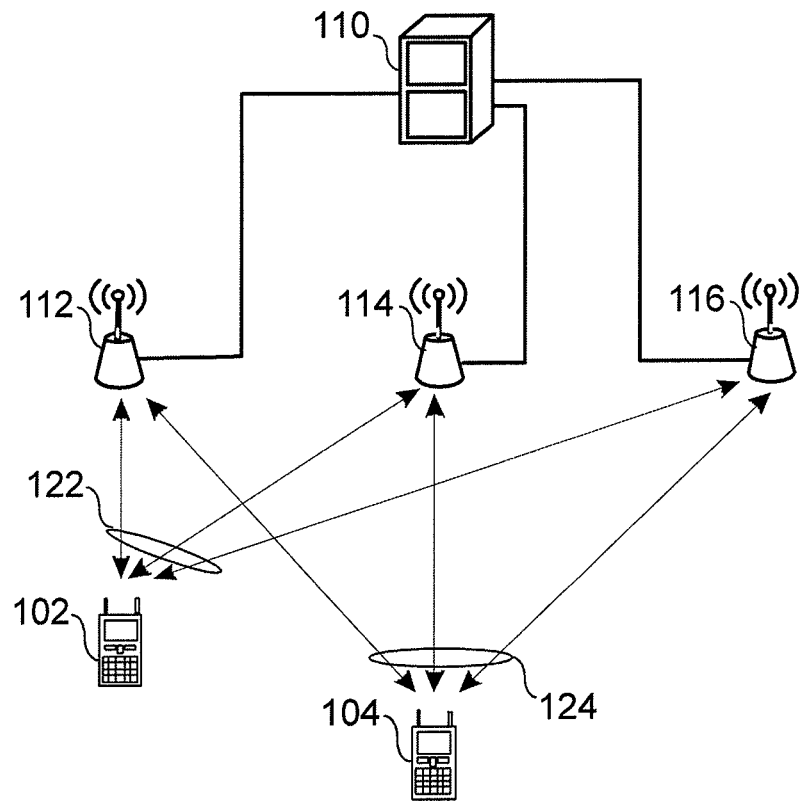
FIG. 1A illustrates a cell with multiple remote radio heads in one embodiment of the invention.

FIG. 1A illustrates a cell with multiple remote radio heads or remote base stations in one embodiment of the invention. The remote radio heads may be referred to as remote radio units. The cell may be comprised in an LTE mobile network, comprising, for example, an Evolved UMTS Radio Access Network (E-UTRAN). In FIG. 1A there is a base station server 110, which is, for example, an Evolved Node B (eNB) base station server. The base station server communicates with Remote Radio Heads (RRH) 112, 114 and 116. An RRH, such as RRH 112, 114 and 116, may comprise an RF circuit, an analog-to-digital/digital-to-analog converter and an up/down converter, which are not shown. The RRH may also have operation and management processing capabilities and may have an interface to connect to base station server 110. The interface may be an optical interface. RRHs 112, 114 and 116 may also be used for Multiple-Input and Multiple-Output (MIMO) transmission between a base station and a mobile node. In a cell provided by RRHs 112, 114 and 116 there is shown a mobile node 102 and a mobile node 104. The transmission propagation paths between mobile node 102 and RRHs 112, 114 and 116 are illustrated with arrows indicated with oval 122, whereas the transmission propagation paths between mobile node 104 and RRHs 112, 114 and 116 are indicated with oval 124. It should be noted that, if different transmission powers and frequencies are used by an RRH and a mobile node, the delay spreads may be different in uplink and downlink transmissions. Even though the minimum transmission propagation paths are the same in both directions, the actual reflections for the frequencies may differ. However, if approximately same frequencies or same frequency bands are used between a mobile node and an RRH, as in the case of Time-Division Duplex (TDD), the delay spreads may be approximately similar.

From a second point of view base station server 110 may also be a coordinated multipoint transmission and reception control unit which may coordinate transmission and reception of to and from a single mobile node via multiple separate points. Thus, the RRHs 112, 114 and 116 may also be comprised in different base stations. RRHs 112, 114 and 116 may also be remote base stations accessed from the transmission and reception control unit. In 4G LTE coordinated multipoint transmission and reception requires close coordination between geographically separated base stations, which dynamically coordinate to provide joint scheduling and transmissions as well as proving joint processing of the received signals. In this way a mobile node at the edge of a cell is able to be served by two or more base station from different cells to improve signal reception and transmission and increase throughput particularly under cell edge conditions.

RRHs 112, 114 and 116 monitor the delay spreads in the uplink radio signals received from mobile node 102 and mobile node 104. In response to the monitoring, RRHs 112, 114 and 116 indicate the uplink delay spreads measured by them to base station server 110. Based on a maximum delay spread measured by one of the RRHs 112, 114 and 116, base station server 110 selects an uplink direction cyclic prefix length. The uplink direction cyclic prefix length is specific to a given mobile node such as mobile node 102 or mobile node 104. Simultaneously, base station server 110 may also select a downlink direction cyclic prefix length. Base station server 110 indicates the uplink direction cyclic prefix length to be used by a mobile node in uplink transmission via signaling on a radio resource used by the mobile node. Base station server 110 may also indicate the downlink direction cyclic prefix length to be used by a mobile node in downlink reception via signaling on a radio resource used by the mobile node. The signaling may be Packet Data Control Channel (PDCCH) signaling, Media Access Control (MAC) signaling or Radio Resource Control (RRC) signaling. The cyclic prefix lengths may be indicated in as the duration of the cyclic prefix, for example, in microseconds, milliseconds or seconds. The duration of the cyclic prefixes may be indicated also as a fraction of a radio slot, subframe or frame. The duration of a cyclic prefix may be indicated also as a number of predefined cyclic prefix lengths such as, for example, as a normal cyclic prefix and an extended cyclic prefix. The cyclic prefix length for uplink transmission is used by the mobile node in adding a cyclic prefix of the indicated length in front of a symbol to be transmitted by the mobile node. The cyclic prefix length for downlink transmission is used by the mobile node in separating the cyclic prefix in front of a symbol from the actual useful symbol.

In one embodiment of the invention, the uplink and downlink cyclic prefix lengths indicated by base station server 110 may be used in user plane transmission, which is the transmission of symbols, slots, frames or subframes comprising user plane data. An extended cyclic prefix, which may be used by all mobile nodes in a cell, may be used in signaling plane transmission.

In one embodiment of the invention, the uplink and downlink cyclic prefix lengths indicated by base station server 110 may be used in signaling plane transmission.

Signaling plane transmission may be the transmission of symbols, slots, frames or subframes comprising signaling plane data.

In FIG. 1A it is assumed that delay spread in the signal consisting of transmissions 122 is larger than the delay spread in the signal consisting of transmissions 124.

Figure 1B:
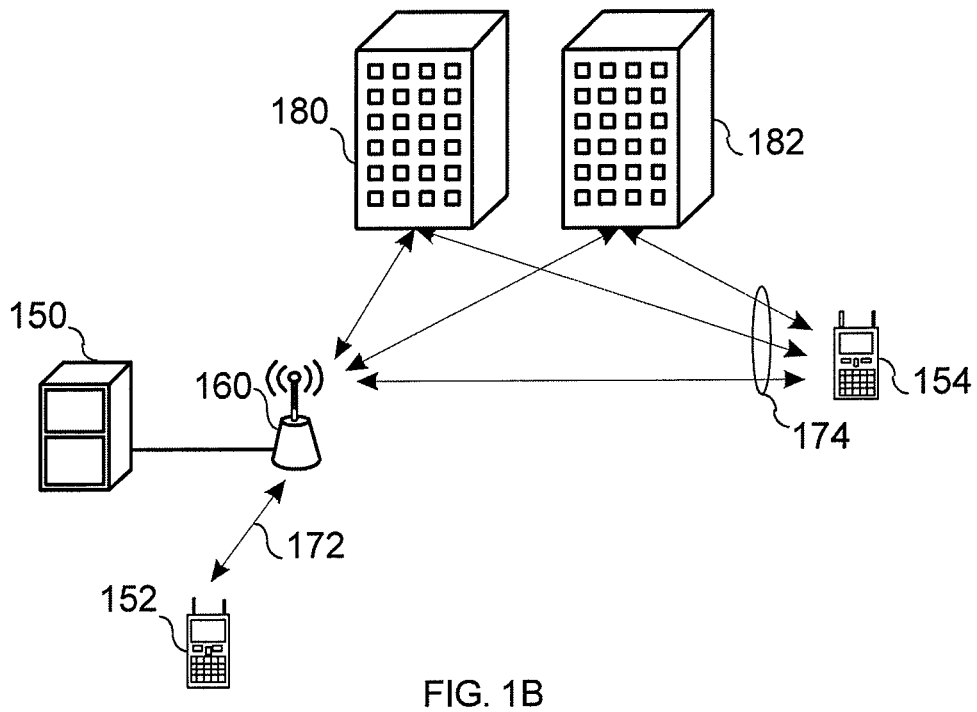
FIG. 1B illustrates a cell having different propagation environments in one embodiment of the invention.

FIG. 1B illustrates a cell having different propagation environments in one embodiment of the invention. The cell may be comprised in an LTE mobile network, comprising, for example, an Evolved UMTS Radio Access Network (E-UTRAN). There is illustrated a mobile node 152 and a mobile node 154. There is also a base station server 150 and an RRH 160. Base station server 150 may be also a base station and RRH 160 may also be an antenna. Base station server 150 is, for example, an Evolved Node B (eNB) base station server or base station. The transmission propagation path between mobile node 152 and RRH 160 is illustrated with arrow 172. There are also illustrated two high-rise buildings 180 and 182 which reflect radio signals. The transmission propagation paths assuming single reflections from buildings 180 and 182 are illustrated with an arrow indicated with oval 174. The transmission propagation paths are provided only for illustrative purposes and indicate a simplified situation. The actual transmission propagation paths depend on different circumstances and may vary in uplink and downlink direction depending on transmission power, frequencies used and the actual propagation environment.

RRH 160 is configured to monitor the uplink direction delay spreads in the radio signals received from mobile node 152 and mobile node 154. In response to the monitoring by RRH 160, RRH 160 indicates the delay spread measured to base station server 150. Base station server 150 selects the uplink direction cyclic prefix length to be used by a mobile node in uplink transmissions via signaling on a radio resource used by the mobile node. The signaling may be Packet Data Control Channel (PDCCH) signaling, Media Access Control (MAC) signaling or Radio Resource Control (RRC) signaling. Similarly, in response to the monitoring, RRH 160 may also select a downlink direction cyclic prefix length and indicate the selected length to the mobile node, for example, on the signaling mentioned. The cyclic prefix lengths may be indicated in as the duration of the cyclic prefix, for example, in microseconds, milliseconds or seconds. The duration of the cyclic prefixes may be indicated also as a fraction of a radio slot, subframe or frame. The duration of a cyclic prefix may be indicated also as a number of predefined cyclic prefix lengths such as, for example, as a normal cyclic prefix and an extended cyclic prefix. The cyclic prefix length for uplink transmission is used by the mobile node in adding a cyclic prefix of the indicated length in front of a symbol to be transmitted by the mobile node. The cyclic prefix length for downlink transmission is used by the mobile node in separating the cyclic prefix in front of a symbol from the actual useful symbol.

The embodiments of the invention described hereinbefore in association with FIGS. 1A and 1B may be used in any combination with each other. Several of the embodiments may be combined together to form a further embodiment of the invention.

Figure 2:
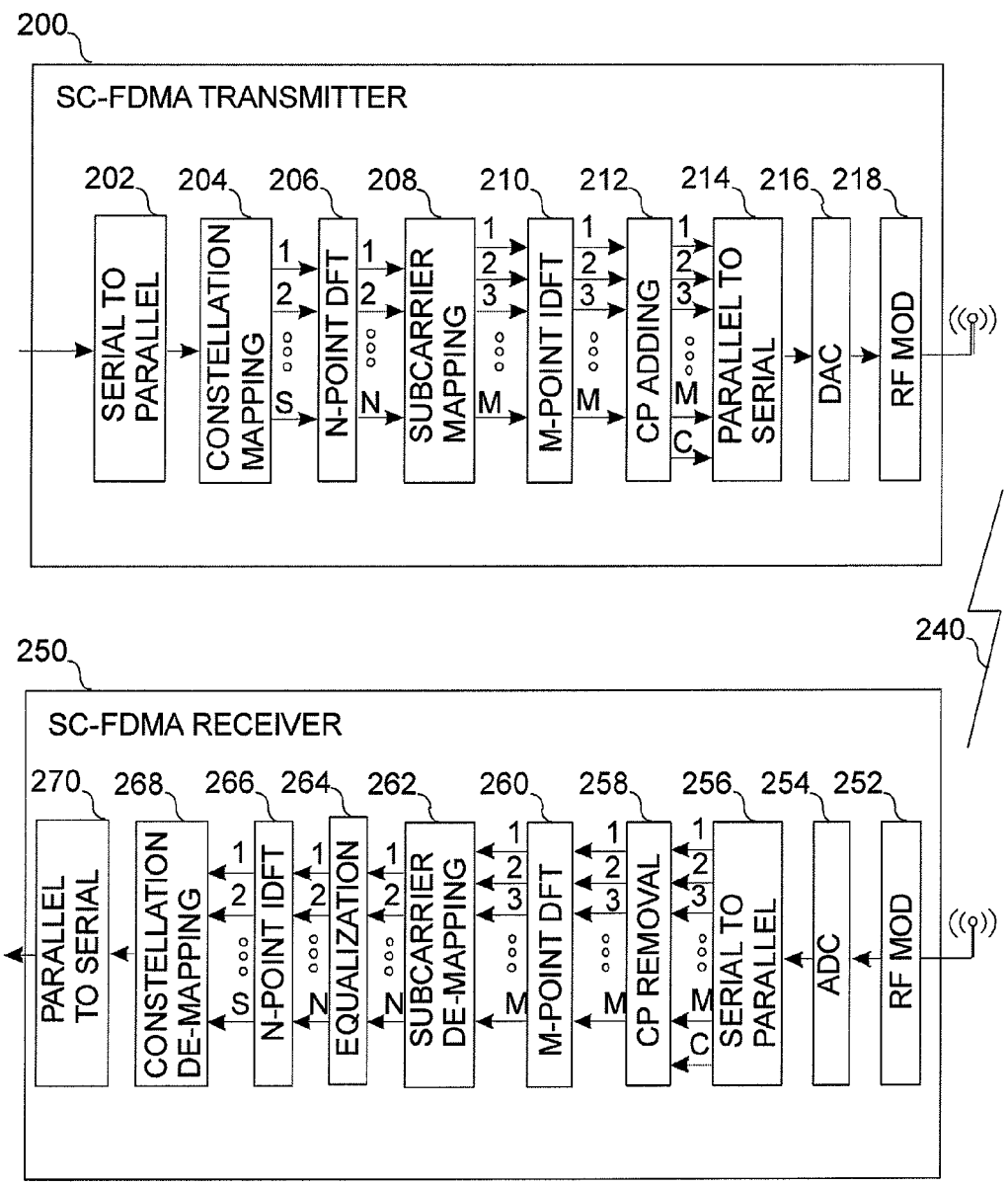
FIG. 2 is a block diagram illustrating a single-carrier frequency division multiple access transmitter and a single-carrier frequency division multiple access transmitter receiver in one embodiment of the invention.

FIG. 2 is a block diagram illustrating a single-carrier frequency division multiple access transmitter and a single-carrier frequency division multiple access receiver in one embodiment of the invention.

A Single-Carrier Frequency Division Multiple Access (SC-FDMA) transmitter, referred to as, a transmitter 200 performs the transmission of an SC-FDMA signal, whereas a Single-Carrier Frequency Division Multiple Access (SC-FDMA) receiver, referred to as, a receiver 200 performs the reception of an SC-FDMA signal. Transmitter 200 may be located in a mobile node such as mobile nodes illustrated in FIGS. 1A and 1B. Receiver 250 may be located in an RRH such as RRHs illustrated in FIGS. 1A and 1B or in an RRH and a base station server such as base station servers illustrated in FIGS. 1A and 1B. Some of the stages may be performed in a base station server.

Transmitter 200 converts a binary input signal to a sequence of modulated subcarriers. Signal processing is performed in stages illustrated in FIG. 2. The stages may be circuits that are part of a single combined circuit. Signal processing may be performed in Transmission Time Intervals (TTI), the length of which may be 0.5 ms. A TTI comprises a number of slots. The transmitted signal in each slot may be described by a resource grid of a number of subcarriers and SC-FDMA symbols. The number of subcarriers in the resource grid depends on the uplink transmission bandwidth configured in the cell in which transmitter 200 is used. The number of SC-FDMA symbols in the resource grid depends on the cyclic prefix length. A resource grid may further comprise a number of resource blocks. A resource block may comprise, for example, 12 subcarriers. The number of SC-FDMA symbols may vary, for example, between 6 and 7, if cyclic prefixes of lengths between 4.7 μs and 16.67 μs are used, or between 3 and 7, if cyclic prefixes of lengths between 4.7 μs and 33.3 μs are used. The number of SC-FDMA symbols may also vary depending on the symbol time duration and the cyclic prefix length. A sequence of incoming bits is first converted from serial to parallel form in stage 202. A parallel block of bits to be transmitted on the physical uplink shared channel is scrambled using a mobile node specific scrambling sequence prior to modulation. The block of scrambled bits is modulated using, for example, Quadrature Phase Shift Keying (QPSK), 16 point Quadrature Amplitude Modulation (16QAM) or 64 point Quadrature Amplitude Modulation (64QAM) in constellation mapping stage 204. Constellation mapping stage 204 produces a number of parallel bits represented in frequency domain as S complex valued modulation symbols. For the S complex valued modulation symbols is performed an N-point Discrete Fourier Transformation (DFT) in stage 206, which results in N frequency domain samples. The S complex valued modulation symbols are transformed into frequency domain in stage 206. In stage 208 the N frequency domain samples are mapped to M orthogonal subcarriers. Each of the N frequency domain samples is mapped to a different subcarrier. N=M/Q is an integer sub-multiple of M and Q is the bandwidth expansion factor. The result of subcarrier mapping stage 208 is M complex subcarrier amplitudes, where N of the subcarrier amplitudes are non-zero. At stage 210 an M-point Inverse Discrete Fourier Transform (IDFT) transforms the complex subcarrier amplitudes to M complex time domain samples. The complex time domain samples form a complex time domain signal. At stage 212 to the M complex time domain samples is added a cyclic prefix C. At stage 210 the M+1 time domain samples are converted to a serial signal. The stages 210 and 212 may use information on the cyclic prefix length as provided from a first processor in communication with transmitter 200. Due to the fact that the cyclic prefix is a copy of the last part of a block comprising the M time domain samples, the cyclic prefix may be seen to convert a discrete time linear convolution into a discrete time circular convolution. For the serial signal is applied digital-to-analog conversion in stage 216 to produce an analog signal. At stage 218 the analog signal is modulated to a final transmission radio frequency and transmitted as a radio signal 240.

Receiver 250 de-modulates the radio signal 240 at stage 252 to produce an analog signal. At stage 254 for the analog signal is applied analog-to-digital conversion to produce a serial signal. At stage 256 the serial signal is converted to M+1 time domain signals. At stage 258 M complex time domain signals are produced for stage 260 thereby removing the cyclic prefix. The stages 256 and 258 may use information on the cyclic prefix length as provided from a second processor in communication with receiver 250. At stage 260 an M-point Discrete Fourier Transform (DFT) is applied for the M complex time domain samples to produce complex subcarrier amplitudes. The complex subcarrier amplitutes are de-mapped at stage 262 to provide N complex valued modulation symbols. At stage 264 the N complex valued modulation symbols are equalized. At stage 266 N-point Inverse Discrete Fourier Transform (IDFT) is performed for the N equalized complex valued modulation symbols to obtain S complex valued modulation symbols. At stage 268 constellation de-mapping produces a number of parallel bits from the S complex valued modulation symbols. At stage 270 the parallel bits are converted to a series of outgoing bits. For the outgoing bits is performed de-scrambling using the mobile node specific scrambling sequence.

The stages in transmitter 200 and receiver 250 may be circuits that are part of a single larger circuit. The stages may be combined in any way to produce a combined circuit.

Receiver 250 also performs uplink direction delay spread measurement. The uplink direction delay spread measurement is performed, for example, using a separate circuit. The delay spread may be the root-mean-square (RMS) delay spread.

Figure 3:
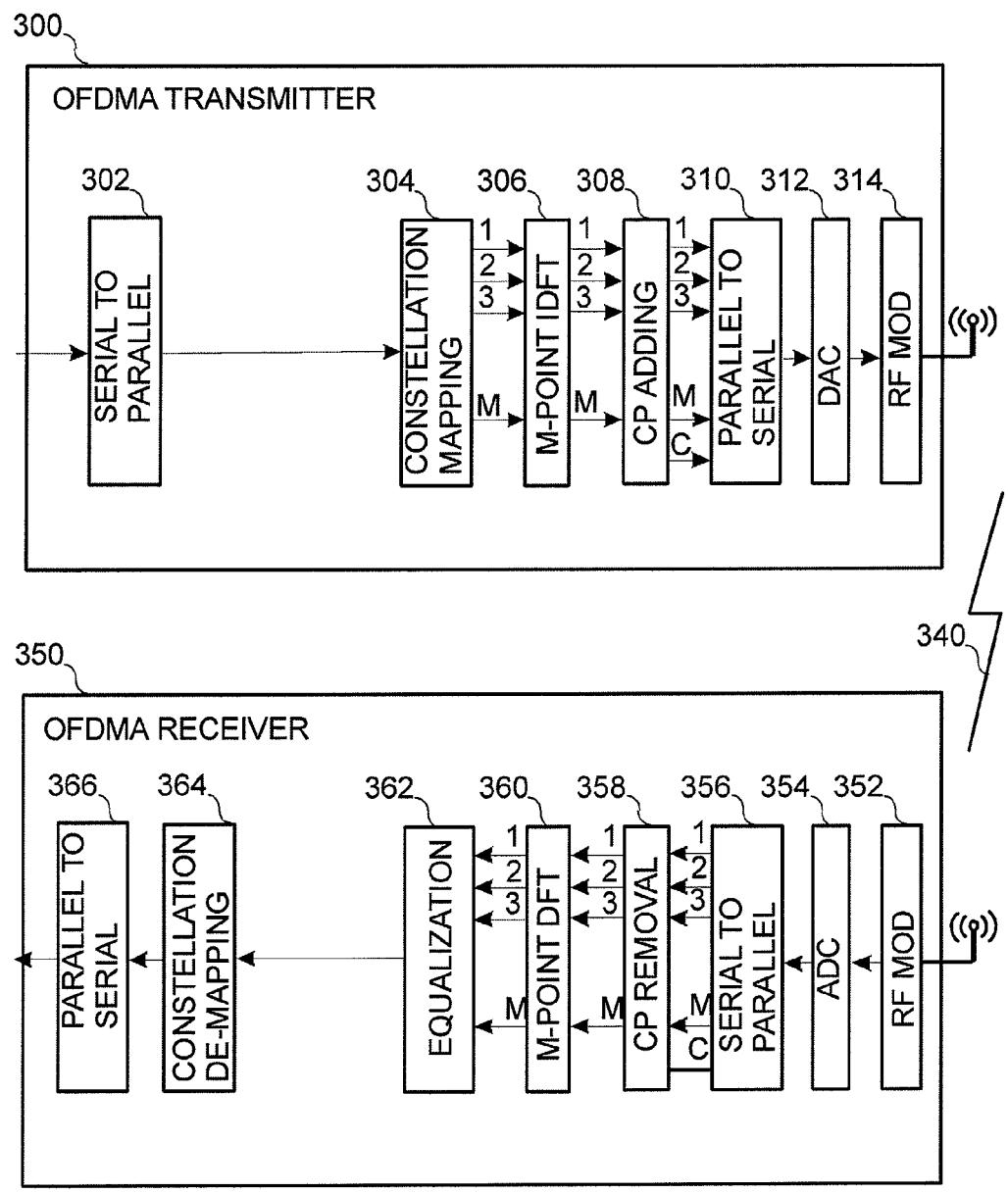
FIG. 3 is a block diagram illustrating an orthogonal frequency division multiple access transmitter and an orthogonal frequency division multiple access transmitter receiver in one embodiment of the invention.

FIG. 3 is a block diagram illustrating an orthogonal frequency division multiple access transmitter and an orthogonal frequency division multiple access transmitter receiver in one embodiment of the invention.

An Orthogonal Frequency Division Multiple Access (OFDMA) transmitter, referred to as, a transmitter 300 performs the transmission of an OFDMA signal, whereas an OFDMA receiver, referred to as, a receiver 350 performs the reception of an SC-FDMA signal. Receiver 350 may be located in a mobile node such as mobile nodes illustrated in FIGS. 1A and 1B. Transmitter 300 may be located in an RRH such as RRHs illustrated in FIGS. 1A and 1B or in an RRH and a base station server such as base station servers illustrated in FIGS. 1A and 1B. Some of the stages may be performed in a base station server.

Transmitter 300 converts a binary input signal to parallel modulated subcarriers. Signal processing is performed in stages illustrated in FIG. 3. Signal processing may be performed in Transmission Time Intervals (TTI), the length of which may be 0.5 ms. A TTI comprises a number of slots. The transmitted signal in each slot may be described by a resource grid of a number of subcarriers and OFDMA symbols. The number of subcarriers in the resource grid depends on the downlink transmission bandwidth configured in the cell in which transmitter 300 is used. The number of OFDMA symbols in the resource grid depends on the cyclic prefix length. A resource grid may further comprise a number of resource blocks. A resource block may comprise, for example, 12 subcarriers. The number of OFDMA symbols may vary, for example, between 6 and 7, if cyclic prefixes of lengths between 4.7 μs and 16.67 μs are used, or between 3 and 7, if cyclic prefixes of lengths between 4.7 μs and 33.3 μs are used.

The number of OFDMA symbols may also vary depending on the OFDMA symbol time duration and the cyclic prefix length. A sequence of incoming bits is first converted from serial to parallel form in stage 302. A parallel block of bits to be transmitted on the physical downlink shared channel is scrambled using a mobile node specific scrambling sequence prior to modulation. The block of scrambled bits is modulated using, for example, Quadrature Phase Shift Keying (QPSK), 16 point Quadrature Amplitude Modulation (16QAM) or 64 point Quadrature Amplitude Modulation (64QAM) in a constellation mapping stage 304. Constellation mapping stage 304 produces a number of parallel bits represented in frequency domain as M complex valued modulation symbols. At stage 306 an M-point Inverse Discrete Fourier Transform (IDFT) produces M subcarrier signals from the M complex valued modulation symbols. At stage 308 to the M subcarrier signals is added a cyclic prefix C. At stage 310 the M+1 time domain samples are converted to a serial signal. The stages 308 and 310 may use information on the cyclic prefix length as provided from a first processor in communication with transmitter 300. Due to the fact that the cyclic prefix is a copy of the last part of a block comprising the M time domain samples, the cyclic prefix may be seen to convert a discrete time linear convolution into a discrete time circular convolution. For the serial signal is applied digital-to-analog conversion at stage 312 to produce an analog signal. At stage 314 the analog signal is modulated to a final transmission radio frequency and transmitted as a radio signal 340.

In case multiple antenna ports are used, there is also a separate stage for layer mapping after constellation mapping stage 304. The following stages may be separate for the different antenna ports.

Receiver 350 de-modulates the radio signal 340 at stage 352 to produce an analog signal. At stage 354 for the analog signal is applied analog-to-digital conversion to produce a serial signal. At stage 356 the serial signal is converted to M+1 parallel subcarrier signals. At stage 358 M parallel subcarrier signals are produced for stage 360 thereby removing the cyclic prefix. The stages 356 and 358 may use information on the cyclic prefix length as provided from a second processor in communication with receiver 350. At stage 360 an M-point Discrete Fourier Transform (DFT) is applied for the M parallel subcarrier signals to produce M complex valued modulation symbols. At stage 362 the M complex valued modulation symbols are equalized. At stage 364 constellation de-mapping produces a number of parallel bits from the M complex valued modulation symbols. At stage 366 the parallel bits are converted to series of outgoing bits. For the outgoing bits is performed de-scrambling using the mobile node specific scrambling sequence.

The stages in transmitter 300 and receiver 350 may be separate circuits or circuits that are part of a single combined circuit. The stages may be combined in any way to produce a combined circuit.

Receiver 350 may also performs downlink direction delay spread measurement. The downlink direction delay spread measurement is performed, for example, using a separate circuit. The delay spread may be the root-mean-square (RMS) delay spread.

Figure 4:
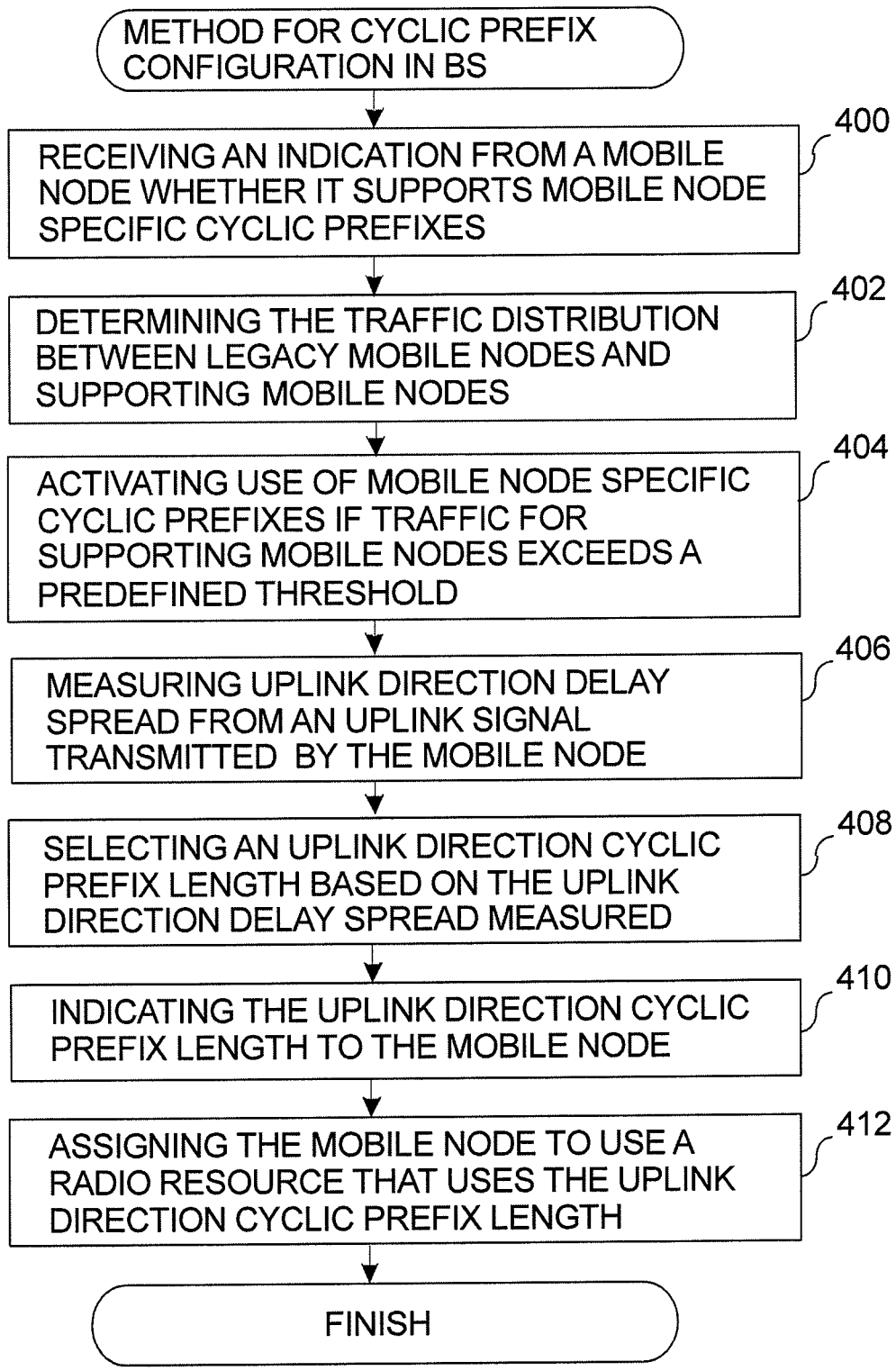
FIG. 4 is a flow chart illustrating a method for cyclic prefix configuration in a base station in one embodiment of the invention.

FIG. 4 is a flow chart illustrating a method for cyclic prefix configuration in a base station node in one embodiment of the invention.

At step 400 an indication is received from a mobile node whether the mobile node supports mobile node specific cyclic prefixes within a single cell.

In one embodiment of the invention, the mobile node specific cyclic prefixes may be used for user plane data transmission. An uplink direction cyclic prefix of an uplink direction cyclic prefix length selected by the base station node may be used in physical uplink shared channel. A downlink direction cyclic prefix of a downlink direction cyclic prefix length selected by the base station node may be used in physical downlink shared channel.

In one embodiment of the invention, the base station node is a base station server which is communicatively connected to at least one remote radio head.

In one embodiment of the invention, the base station node comprises a central unit of a coordinated multipoint transmission and reception set of base stations.

At step 402 the base station node determines the traffic distribution between mobile nodes supporting mobile node specific cyclic prefixes and legacy mobile nodes that do not support mobile node specific cyclic prefixes.

At step 404 the base station node activates the use of mobile node specific cyclic prefixes if traffic for mobile nodes supporting mobile node specific cyclic prefixes exceeds a predefined threshold.

In one embodiment of the invention, the traffic comprises at least one of number of supporting mobile nodes, number of supporting mobile nodes in relation to non-supporting legacy mobile nodes and amount of transmitted data from or to supporting mobile nodes in relation to non-supporting legacy mobile nodes.

At step 406 the base station node measures an uplink direction delay spread from an uplink signal transmitted by the mobile node.

The mobile node may be configured to transmit at least one radio resource that is adapted to allow measuring of delay spread in the base station node. The radio resource may be, for example, a broadcast channel or a synchronization channel.

In one embodiment of the invention, the base station node measures the delay spread periodically in order to cope with possible changes in the propagation environment and the mobile node position within a cell footprint.

At step 408 the base station node selects an uplink direction cyclic prefix length based on the uplink direction delay spread measured by the base station node.

In one embodiment of the invention, the selection comprises the use of a cyclic prefix that exceeds the length of the delay spread measured.

In one embodiment of the invention, a cyclic prefix used in the physical downlink shared channel is adapted to the delay spread measured.

In one embodiment of the invention, a cyclic prefix used in the physical uplink shared channel is adapted to the delay spread measured.

At step 410 the base station node indicates the uplink direction cyclic prefix length to the mobile node.

In one embodiment of the invention, the uplink direction cyclic prefix length is indicated as the length of the uplink direction cyclic prefix in a time unit.

In one embodiment of the invention, the uplink direction cyclic prefix is indicated as a preferred cyclic prefix length, the cyclic prefix length being selected from a number of predefined cyclic prefix lengths, for example, an extended cyclic prefix and a normal cyclic prefix.

At step 412 the base station node assigns the mobile node to use a radio resource that uses the uplink direction cyclic prefix length selected. Thereupon, the base station may receive or transmit a radio resource that uses the adapted cyclic prefix. The radio resource may comprise at least one of a slot, a subframe and a frame.

In one embodiment of the invention, there may be a different cyclic prefixes for downlink and uplink. The lengths of both of the cyclic prefixes may be selected by the base station node. The downlink direction cyclic length may be selected by the mobile node based on a delay spread measured by the mobile node. The selected downlink direction cyclic prefix length may be transmitted from the mobile node to the base station node.

Figure 5:
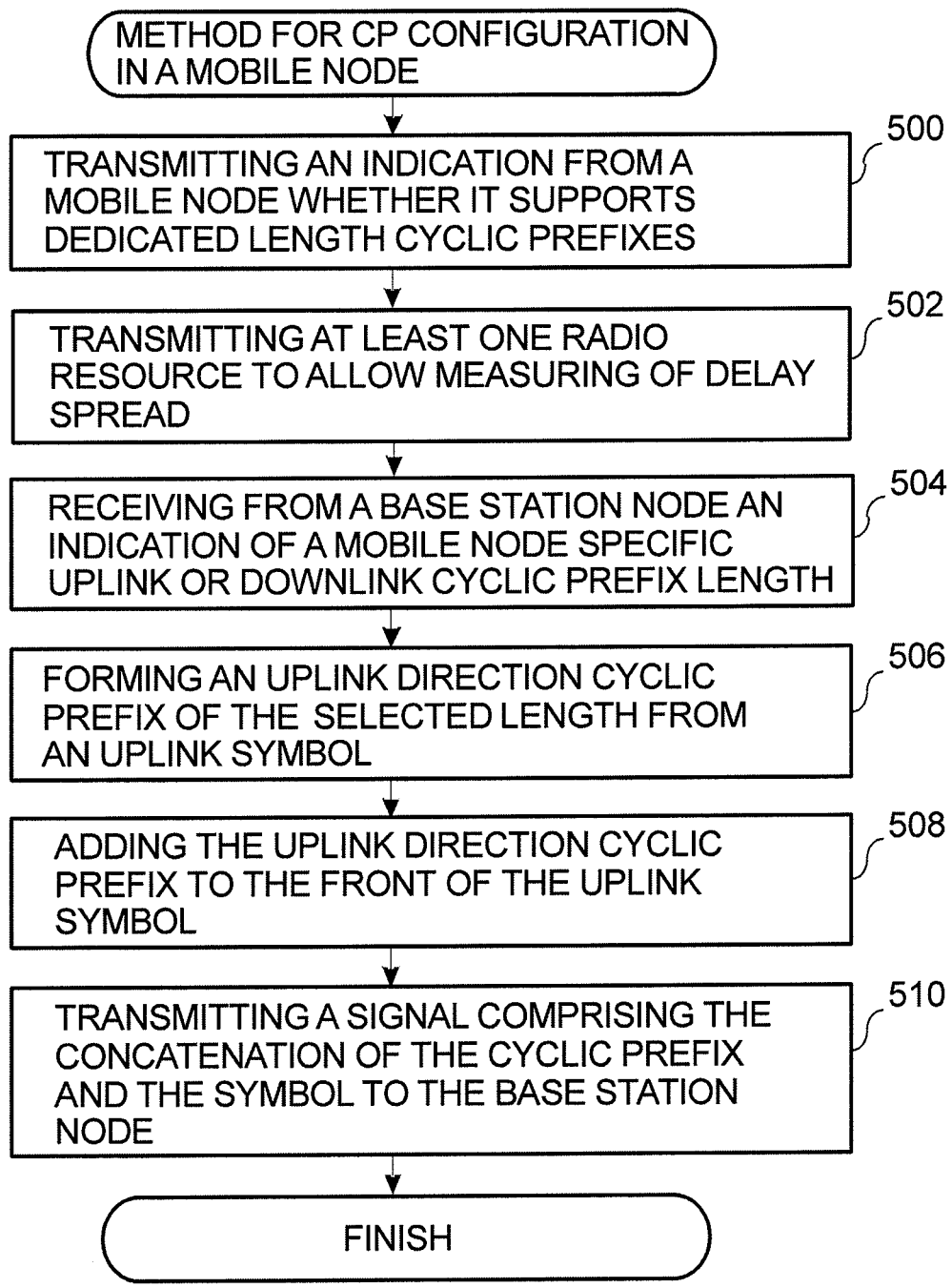
FIG. 5 is a flow chart illustrating a method for cyclic prefix configuration in a mobile node in one embodiment of the invention.

FIG. 5 is a flow chart illustrating a method for cyclic prefix configuration in a mobile node in one embodiment of the invention.

At step 500 a mobile node transmits an indication whether it supports dedicated length cyclic prefixes, for example, mobile node specific variable length cyclic prefixes when the mobile node is in the area of a single cell.

At step 502 the mobile node transmits at least one radio resource in order to allow the measuring of delay spread at a base station.

At step 504 the mobile node receives from a base station node an indication of an uplink direction cyclic prefix length selected by the base station node for the mobile node. The mobile node may also receive from the base station node an indication of a downlink direction cyclic prefix length selected by the base station node for the mobile node. Other mobile nodes may receive indications of different cyclic prefix lengths.

The mobile node specific cyclic prefix lengths for the uplink direction and downlink direction may be selected on the basis of the delay spread measured at the base station for the at least one radio resource transmitted by the mobile node. The base station node may be separate from the base station performing the measuring of the delay spread. A base station node may receive indications of delay spread measured by multiple base stations in communication with the base station node. The base station node may select the maximum delay spread to select the uplink direction cyclic prefix length.

At step 506 the mobile node forms an uplink direction cyclic prefix, of the uplink direction cyclic prefix length selected, from an uplink symbol, for example, a useful symbol.

A useful symbol may also be described as an encoded symbol. In the case of SC-FDMA the useful symbol comprises a single frequency carrier modulated with at least one complex time domain signal. The at least one complex time domain signal is in turn obtained from an M-point inverse DFT, as illustrated in FIG. 2. The useful uplink symbol may comprise data received from an upper layer protocol stack entity.

At step 508 the mobile node adds the uplink the uplink direction cyclic prefix to the front of the uplink symbol, which is, for example, a useful symbol.

At step 510 the mobile node transmits an uplink signal comprising a concatenation of the cyclic prefix and the uplink symbol to the base station node. The uplink symbol is, for example, a useful symbol.

In one embodiment of the invention, the mobile node may receive from the base station node an indication of a downlink direction cyclic prefix length to be used by the mobile node in receiving at least one radio resource carrying downlink data.

In one embodiment of the invention, the indication of the cyclic prefix length to be used is provided using, for example, radio resource control signaling or medium access control signaling.

In one embodiment of the invention, the mobile node may receive an indication that the cyclic prefix length to be used on the radio resource is changed. In response, the mobile node is configured to start forming cyclic prefix of the changed length by using useful symbols.

Figure 6:
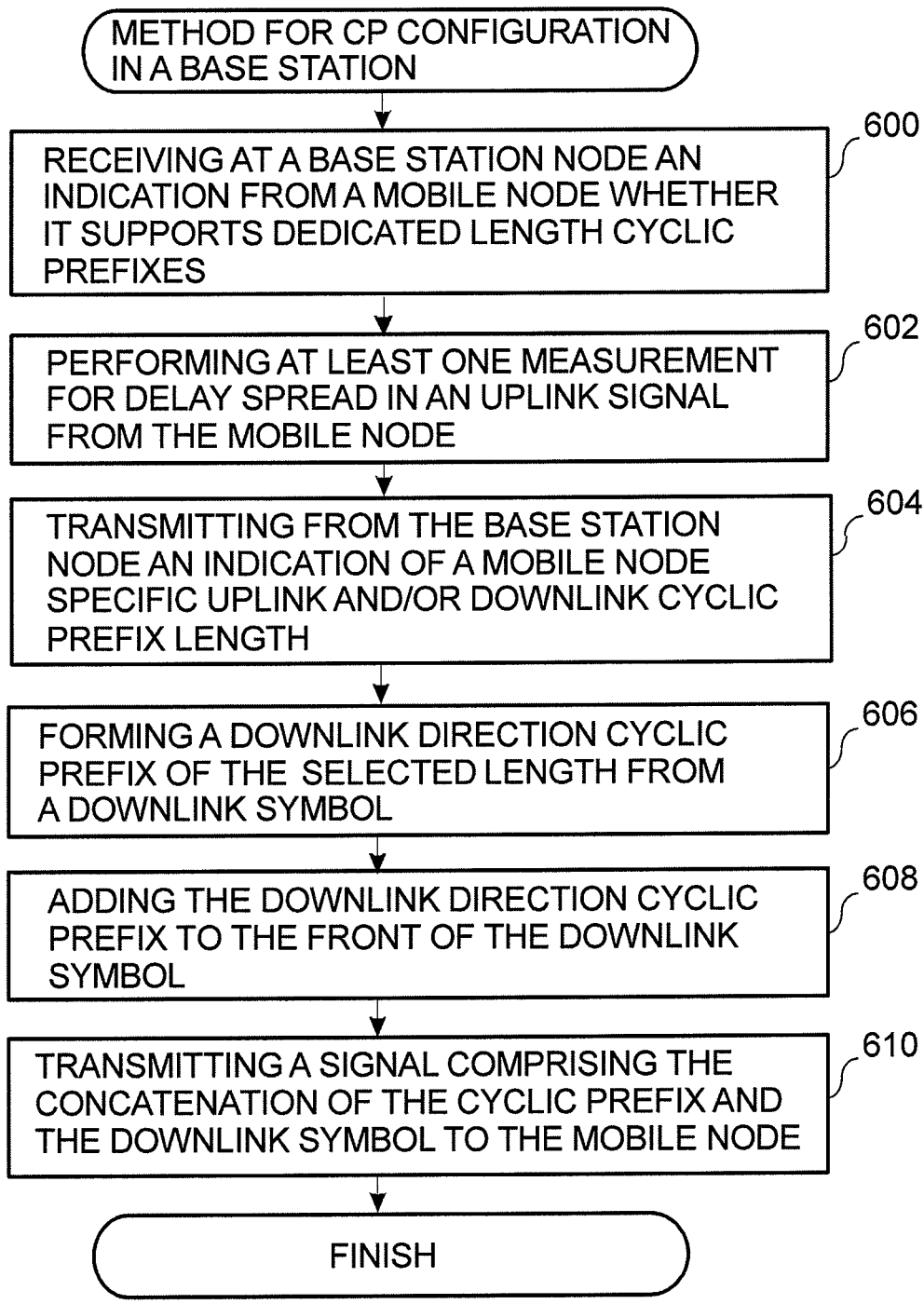
FIG. 6 is a flow chart illustrating a method for cyclic prefix configuration in a mobile node in one embodiment of the invention.

FIG. 6 is a flow chart illustrating a method for cyclic prefix configuration in a base station node in one embodiment of the invention.

At step 600 a base station node receives an indication from a mobile node whether the mobile node supports dedicated length cyclic prefixes, that is, whether the mobile node supports mobile node specific cyclic prefixes while the mobile node is in the area of a single cell.

At step 602 the base station node performs at least one measurement for delay spread in an uplink signal from the mobile node. At least part of a measurement may be performed in a separate receiver unit, for example, a remote radio head, that is communicatively connected to a base station node, which may be, for example, a base station server or a base station unit.

At step 604 the base station node selects an uplink direction cyclic prefix length for the mobile node based on the at least one measurement. The base station node transmits an indication of a cyclic prefix length specific for the mobile node. The cyclic prefix length may be indicated for at least one of the uplink direction and the downlink direction.

At step 606 the base station node forms a downlink direction cyclic prefix of the selected length from a downlink symbol, for example, a useful downlink symbol. At step 606 the selected length is used only if mobile node specific cyclic prefixes are used in downlink transmission. Otherwise, a cell specific default downlink direction cyclic prefix length is used. The default downlink direction cyclic prefix length may be used by mobile node not supporting mobile node specific cyclic prefix lengths.

At step 608 the base station node adds the downlink direction cyclic prefix to the front of the useful downlink symbol, that is, the downlink symbol.

A useful symbol may be described as an encoded symbol. In the case of OFDMA the useful symbol may be seen as a time superposition of the M narrowband modulated sub-carriers of FIG. 3 obtained from the M-point inverse DFT of FIG. 3. The useful uplink symbol may comprise data received from an upper layer protocol stack entity.

At step 610 the base station node transmits a signal comprising the concatenation of the cyclic prefix and the symbol to the mobile node.

The steps 602, 606, 608 and 610 may be performed in a separate receiver unit, for example, a remote radio head or a remote base station communicatively connected to the base station node.

Figure 7:
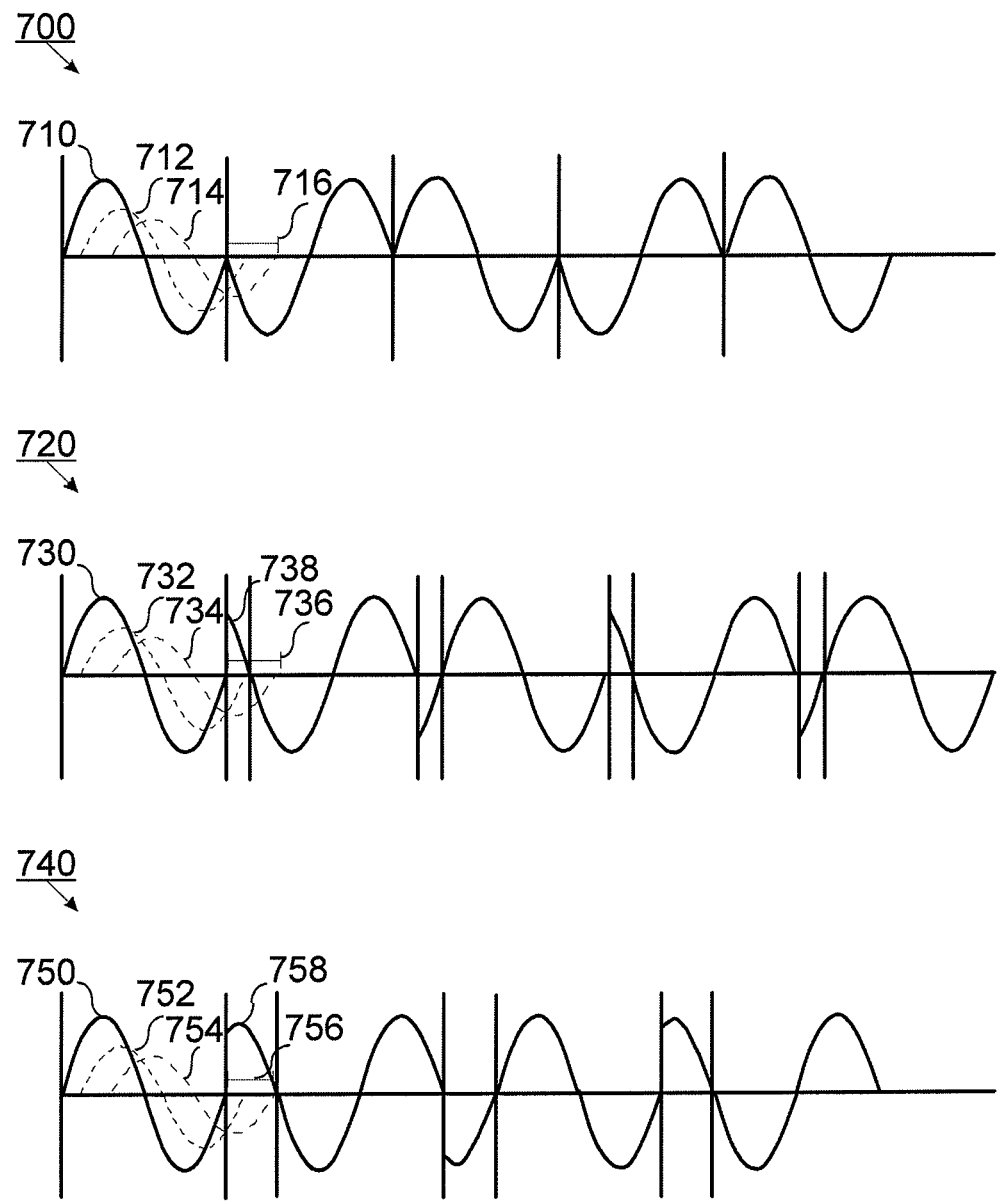
FIG. 7 illustrates the use of different cyclic prefix lengths in one embodiment of the invention.

FIG. 7 illustrates the use of different cyclic prefix lengths in one embodiment of the invention. A signal 700 without a cyclic prefix comprises a useful symbol 710. The useful symbol 610 is faded by reflections 712 and 714. The delay spread length is illustrated with line 716.

A signal 720 with a short cyclic prefix comprises a useful symbol 730 and a cyclic prefix 738. The useful symbol 730 is faded by reflections 732 and 734. The delay spread length is illustrated with line 736.

A signal 740 with a long cyclic prefix comprises a useful symbol 750 and a cyclic prefix 758. The useful symbol 750 is faded by reflections 752 and 754. The delay spread length is illustrated with line 756. Cyclic prefix 758 is long enough to cover the delay spread in the case of signal 740.

In FIG. 7 the signals are illustrated for simplicity as mere phase shift keying symbols without the effect of more complex constellations and the combination of subcarriers. Cyclic prefix 758 may be, for example, an extended cyclic prefix, whereas cyclic prefix 738 may be, for example, a normal cyclic prefix.

Figure 8:
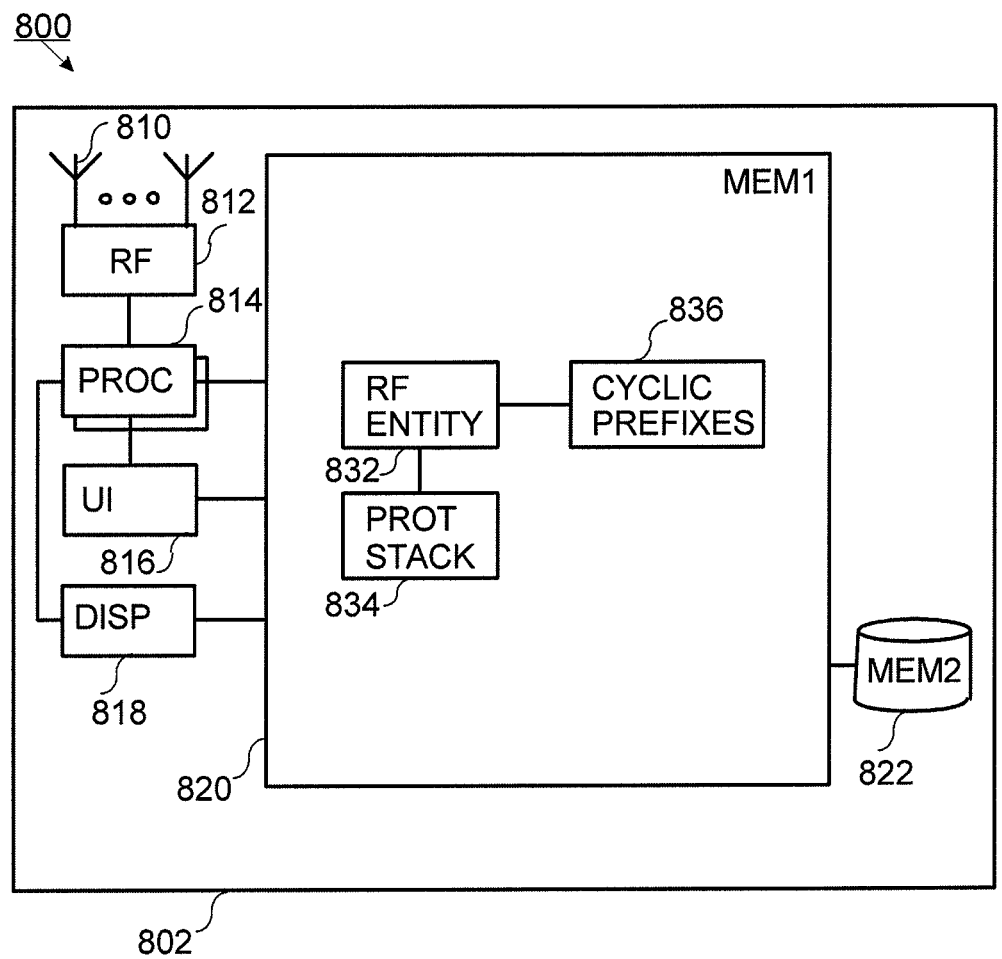
FIG. 8 illustrates an apparatus in one embodiment of the invention.

FIG. 8 is a block diagram illustrating an apparatus in one embodiment of the invention. In FIG. 8 there is an apparatus 800, which is, for example, a mobile node, user equipment, cellular phone, a mobile terminal, an Application Specific Integrated Circuit (ASIC) or any chip or chipset. Apparatus 800 may correspond to a mobile node illustrated in FIGS. 1A and 1B. The internal functions of mobile node 800 are illustrated with a box 802. Mobile node 800 may comprise at least one antenna 810. There may be multiple input and output antennas. In association with mobile node there is Radio Frequency (RF) circuit 812. RF circuit 812 may be also any circuit or may be referred to as circuit 812. RF circuit 812 is communicatively connected to at least one processor 814. Connected to processor 814 there may be a first memory 820, which is, for example, a Random Access Memory (RAM). There may also be a second memory 822, which may be a non-volatile memory, for example, an optical or magnetic disk. There may also be a User Interface (UI) 816 and a display 818. In memory 820 there may be stored software relating to functional entities 832 and 834. An RF entity 832 communicates with RF circuit 812 to set cyclic prefixes 836 to be used by RF circuit 812 in association with different radio resources. RF entity 832 receives an indication of an uplink and possibly a downlink direction cyclic prefix length from a base station via a protocol stack 834. Protocol stack entity 834 comprises control plane protocol functions related to the interface towards an eNB or any base station. RF circuit 812 may comprise the transmitter illustrated in FIG. 2 for SC-FDMA and the receiver illustrated in FIG. 3 for OFDMA. RF circuit 812 also performs delay spread measuring.

In one embodiment of the invention, RF circuit 812 is configured to transmit a radio resource to a base station or a base station node to enable the measuring of an uplink direction delay spread. RF circuit 812 or at least one processor 814 is configured to receive an indication of an uplink direction cyclic prefix length from the base station node. RF circuit 812 is configured to form an uplink direction cyclic prefix of the uplink direction cyclic prefix length selected from a useful uplink symbol, to add the uplink direction cyclic prefix in front of the useful uplink symbol and to transmit an uplink signal comprising the uplink direction cyclic prefix and the useful uplink symbol to the base station node. By RF circuit 812 may be meant at least one circuit configured to perform the tasks indicated for RF circuit 812 in this embodiment or other embodiments.

In one embodiment of the invention, the at least one processor 814 is configured to determine whether the apparatus supports mobile node specific cyclic prefixes and to transmit an indication whether the apparatus supports mobile node specific cyclic prefixes.

When the at least one processor 814 executes functional entities associated with the invention, memory 820 comprises entities such as, any of the functional entities 832 and 834. The functional entities within apparatus 800 illustrated in FIG. 8 may be implemented in a variety of ways. They may be implemented as processes executed under the native operating system of the network node. The entities may be implemented as separate processes or threads or so that a number of different entities are implemented by means of one process or thread. A process or a thread may be the instance of a program block comprising a number of routines, that is, for example, procedures and functions. The functional entities may be implemented as separate computer programs or as a single computer program comprising several routines or functions implementing the entities. The program blocks are stored on at least one computer readable medium such as, for example, a memory circuit, memory card, magnetic or optical disk. Some functional entities may be implemented as program modules linked to another functional entity. The functional entities in FIG. 4 may also be stored in separate memories and executed by separate processors, which communicate, for example, via a message bus or an internal network within the network node. An example of such a message bus is the Peripheral Component Interconnect (PCI) bus.

The exemplary embodiments of the invention can be included within any suitable device, for example, including any suitable servers, workstations, PCs, laptop computers, PDAs, Internet appliances, handheld devices, cellular telephones, wireless devices, other devices, and the like, capable of performing the processes of the exemplary embodiments, and which can communicate via one or more interface mechanisms, including, for example, Internet access, telecommunications in any suitable form (for instance, voice, modem, and the like), wireless communications media, one or more wireless communications networks, cellular communications networks, 3 G communications networks, 4 G communications networks Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware art(s). For example, the functionality of one or more of the components of the exemplary embodiments can be implemented via one or more hardware devices, or one or more software entities such as modules.

The exemplary embodiments can store information relating to various processes described herein. This information can be stored in one or more memories, such as a hard disk, optical disk, magneto-optical disk, RAM, and the like. One or more databases can store the information regarding cyclic prefixes used and the delay spreads measured. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be implemented by the preparation of one or more application-specific integrated circuits or by interconnecting an appropriate network of conventional component circuits, as will be appreciated by those skilled in the electrical art(s).

As stated above, the components of the exemplary embodiments can include computer readable medium or memories according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

The embodiments of the invention described hereinbefore in association with the figures presented may be used in any combination with each other. Several of the embodiments may be combined together to form a further embodiment of the invention.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method, comprising:
performing at least one uplink direction delay spread measurement of a radio resource transmitted by a mobile node;
selecting, at a base station, an uplink direction cyclic prefix length for at least one uplink radio resource based on the at least one uplink direction delay spread measurement;
indicating the selected uplink direction cyclic prefix length to the mobile node;
receiving an uplink direction signal from the mobile node with the uplink direction cyclic prefix length selected; and
activating use of mobile node specific cycle prefixes in response to detecting that a traffic distribution between mobile nodes supporting mobile node specific cycle prefixes and mobile nodes not supporting mobile node specific cyclic prefixes exceeds a predefined threshold.

2. The method according to claim 1, the method further comprising:
removing at least one cyclic prefix from the uplink signal received to obtain at least one useful uplink symbol.

3. The method according to claim 1, the method further comprising:
receiving, at the base station, an indication whether the mobile node supports mobile node specific cyclic prefixes.

4. The method according to claim 1, the method further comprising:
selecting a downlink direction cyclic prefix length for at least one downlink radio resource;
forming a downlink direction cyclic prefix of the downlink direction cyclic prefix length selected from a useful downlink symbol;
adding the downlink direction cyclic prefix in front of the useful downlink symbol; and
transmitting a signal comprising the downlink direction cyclic prefix and the useful downlink symbol to the mobile node.

5. The method according to claim 1, the method further comprising:
transmitting a radio resource to the mobile node to enable the measuring of a downlink direction delay spread at the mobile node.

6. The method according to claim 5, the method further comprising:
receiving from the mobile node an indication of the downlink direction delay spread measured by the mobile node; and
selecting a downlink direction cyclic prefix length based on the downlink direction delay spread.

7. The method according to claim 5, the method further comprising:
receiving from the mobile node an indication of a downlink direction cyclic prefix length.

8. The method according to claim 6, the method further comprising:
indicating the downlink direction cyclic prefix length selected to the mobile node.

9. The method according to claim 1, the method further comprising:
detecting at the base station a change in antenna configuration; and
activating measuring of the delay spread in response to the change in antenna configuration.

10. The method according to claim 1, where the base station is a central unit of a coordinated multipoint transmission and reception base station set.

11. A base station, comprising:
at least one radio frequency circuit configured to perform at least one uplink direction delay spread measurement of a radio resource transmitted by a mobile node and to receive an uplink direction signal from the mobile node with an uplink direction cyclic prefix length selected; and
at least one processor configured to:
select the uplink direction cyclic prefix length for at least one uplink radio resource based on the at least one uplink direction delay spread measurement and to indicate the uplink direction cyclic prefix length selected to the mobile node, and
activating use of mobile node specific cycle prefixes in response to detecting that a traffic distribution between mobile nodes supporting mobile node specific cycle prefixes and mobile nodes not supporting mobile node specific cyclic prefixes exceeds a predefined threshold.

12. A system, comprising:
a first base station receiver configured to measure a first uplink direction delay spread of a radio resource transmitted from a mobile node, to report the first uplink direction delay spread to a base station node, and to receive an uplink direction signal from the mobile node with the uplink direction cyclic prefix length selected;
a second base station receiver configured to measure a second uplink direction delay spread of a radio resource transmitted from a mobile node, to report the second uplink direction delay spread to a base station node, and to receive an uplink direction signal from the mobile node with the uplink direction cyclic prefix length selected; and
a base station node configured to:
select a maximum uplink direction delay spread among the first uplink direction delay spread and the second uplink direction delay spread, to select an uplink direction cyclic prefix length for at least one uplink radio resource based on the maximum uplink direction delay spread and to indicate the uplink direction cyclic prefix length selected to the mobile node, and activating use of mobile node specific cycle prefixes in response to detecting that a traffic distribution between mobile nodes supporting mobile node specific cycle prefixes and mobile nodes not supporting mobile node specific cyclic prefixes exceeds a predefined threshold.

13. A computer readable memory storing a computer program comprising code adapted to cause the following when executed on a data-processing system:

performing at least one uplink direction delay spread measurement of a radio resource transmitted by a mobile node;

selecting, at a base station, an uplink direction cyclic prefix length for at least one uplink radio resource based on the at least one uplink direction delay spread measurement;

indicating the selected uplink direction cyclic prefix length to the mobile node;

receiving an uplink direction signal from the mobile node with the uplink direction cyclic prefix length selected; and activating use of mobile node specific cycle prefixes in response to detecting that a traffic distribution between mobile nodes supporting mobile node specific cycle prefixes and mobile nodes not supporting mobile node specific cyclic prefixes exceeds a predefined threshold.

14. The computer readable memory according to claim 13, wherein the computer program is further adapted to cause:

removing at least one cyclic prefix from the uplink signal received to obtain at least one useful uplink symbol.

15. The computer readable memory according to claim 13, wherein the computer program is further adapted to cause:

receiving, at the base station, an indication whether the mobile node supports mobile node specific cyclic prefixes.

16. The computer readable memory according to claim 13, wherein the computer program is further adapted to cause:

selecting a downlink direction cyclic prefix length for at least one downlink radio resource;

forming a downlink direction cyclic prefix of the downlink direction cyclic prefix length selected from a useful downlink symbol;

adding the downlink direction cyclic prefix in front of the useful downlink symbol; and transmitting a signal comprising the downlink direction cyclic prefix and the useful downlink symbol to the mobile node.

17. The computer readable memory according to claim 13, wherein the computer program is further adapted to cause:

transmitting a radio resource to the mobile node to enable the measuring of a downlink direction delay spread at the mobile node.

18. The computer readable memory according to claim 17, wherein the computer program is further adapted to cause:

receiving from the mobile node an indication of the downlink direction delay spread measured by the mobile node; and selecting a downlink direction cyclic prefix length based on the downlink direction delay spread.

19. The computer readable memory according to claim 17, wherein the computer program is further adapted to cause:

receiving from the mobile node an indication of a downlink direction cyclic prefix length.

20. The computer readable memory according to claim 18, wherein the computer program is further adapted to cause:

indicating the downlink direction cyclic prefix length selected to the mobile node.

* * * * *

UNITED STATES PATENT AND TRADEMARK OFFICE
CERTIFICATE OF CORRECTION

PATENT NO. : 8,792,369 B2  
APPLICATION NO. : 13/098810  
DATED : July 29, 2014  
INVENTOR(S) : Seppo Matias Alanärä

Page 1 of 1

It is certified that error appears in the above-identified patent and that said Letters Patent is hereby corrected as shown below:

In the Claims

Column 21, line 40, replace "mobile node specific cycle prefixes in" with --mobile node specific cyclic prefixes in--.

Column 21, lines 42-43, replace "mobile node specific cycle prefixes and mobile nodes" with --mobile node specific cyclic prefixes and mobile nodes--.

Column 22, line 42, replace "mobile node specific cycle prefixes in" with --mobile node specific cyclic prefixes in--.

Column 22, lines 44-45, replace "mobile node specific cycle prefixes and" with --mobile node specific cyclic prefixes and--.

Column 23, line 3, replace "mobile node specific cycle prefixes in" with --mobile node specific cyclic prefixes in--.

Column 23, lines 5-6, replace "mobile node specific cycle prefixes and" with --mobile node specific cyclic prefixes and--.

Column 23, line 22, replace "mobile node specific cycle prefixes in" with --mobile node specific cyclic prefixes in--.

Column 23, lines 24-25, replace "mobile node specific cycle prefixes and mobile nodes" with --mobile node specific cyclic prefixes and mobile nodes--.

Signed and Sealed this  
Twenty-third Day of December, 2014

Michelle K. Lee  
*Deputy Director of the United States Patent and Trademark Office*